United States Patent

[11] 3,557,372

| | | |
|---|---|---|
| [72] | Inventor | Ainsley Neville Ede<br>Cambridge, England |
| [21] | Appl. No. | 784,657 |
| [22] | Filed | Dec. 18, 1968 |
| [45] | Patented | Jan. 19, 1971 |
| [73] | Assignee | Hudswell Yates Developments Limited<br>Leeds, England |
| [32] | Priority | Dec. 18, 1967 |
| [33] | | Great Britain |
| [31] | | 57356/67 |

[54] GUIDANCE SYSTEM WITH OPTICALLY NUTATED RETICLE HAVING GEOMETRY WHICH OBVIATES THE NEED FOR FREQUENCY DISCRIMINATORS
6 Claims, 6 Drawing Figs.

[52] U.S. Cl. ..................................................... 250/203,
250/209, 250/215, 356/152
[51] Int. Cl. ....................................................... G01j 1/20,
H01j 39/12; G01s 1/70
[50] Field of Search............................................ 356/152;
250/203; 250/215, 236, 209

[56] References Cited
UNITED STATES PATENTS
3,364,356  1/1968  Jones........................... 250/203

Primary Examiner—Archie R. Borchelt
Assistant Examiner—T. N. Grigsby
Attorney—Watson, Cole, Grindle & Watson ABSTRACT: A guidance system comprising a transmitter mounted in a fixed position and a receiver fixed to a movable apparatus to be guided along a straight path defined by a modulated beam of light emitted by the transmitter, the transmitter optical system including a source, a reticle and an optical member, the reticle comprising four optical quadrants of differing capacity, the opacities of the first and third quadrants being substantially different from the opacities of the second and fourth quadrants, and the receiver including at least two radiation detectors the outputs of which are both added and subtracted in each case without being first fed through a frequency discriminator, has been inserted to provide first and second signals which can be utilized to guide the movable apparatus along the straight path.

PATENTED JAN 19 1971

INVENTOR
AINSLEY N. EDE

BY
Watson, Cole, Grindle & Watson
ATTORNEYS

GUIDANCE SYSTEM WITH OPTICALLY NUTATED RETICLE HAVING GEOMETRY WHICH OBVIATES THE NEED FOR FREQUENCY DISCRIMINATORS

This invention relates to guidance apparatus for producing a signal or signals indicative of the deviation of a moving object from a given straight path, which signals may be employed either automatically or through a medium of a human operator for restoring the moving object to the required path. Such guidance apparatus is of value in obtaining accurate guidance and control of machinery, for example road surfacing vehicles and ditch digging machines for drainage purposes. It may also be applied to beam-riding craft and missiles.

British Pat. specification No. 1,046,024 describes such guidance apparatus which comprises a transmitter for mounting in a fixed position and a receiver for fixing to a movable apparatus which is to be guided along a straight path determined by the transmitter, the latter comprising a source of visible or infrared radiation for illuminating a first member located in the transmitter and in the form of a reticle divided into alternate bands of different opacity, each band varying in thickness along its length, a second member in the form of an optical member located on the opposite side of the reticle to the source and for collecting radiation which has passed through the reticle from the source, and means for causing effective rotation of the axis of one of the members around the axis of the other member so that during the effective rotation, bands of different opacity alternately move across the path of the collected radiation which after collection is emitted from the transmitter as a beam of radiation, and the receiver including a radiation detector responsive to the beam of radiation, and an electrical circuit for analyzing variations in the radiation reaching the detector, and for producing control signals by use of which the movable apparatus may be guided along the straight path.

The term "axis" in this context has its normal meaning when referring to the axes of lenses and other disc-shaped members. When referring to nondisc-shaped optical members such as prisms, it denotes that line in space which is colinear with the central ray of a beam incident on the if member when in use.

The transmitter thus determines the given straight path, along which the moving object is guided, and which is defined by the axis of the beam of radiation emitted by the transmitter herein referred to as the scan axis or defined line.

As explained in specification No. 1,046,024, it can be considered in order to understand the principle of operation, that as the effective rotation takes place between the reticle and the second member of the transmitter, the image of the reticle nutates around the scan axis or defined line of the transmitter. There is thus relative movement between the detector and the reticle image, the detector moving relatively to the reticle image along a circular path. The output from the detector to the electrical circuit will thus be modulated according to the relative width and opacities of the reticle bands in the circular path. If there is relative displacement between the detector and the scan axis of the transmitter, the circular path, which is in effect is scanned by the detector will be displaced relatively to the reticle image and since the band images have different thicknesses along their length the signal then leaving the detector will be modulated differently than if the detector were located on the scan axis. The different modulations on this signal, either in frequency or amplitude or both, can be analyzed by an electrical circuit which will then produce a signal denoting the deviation of the detector from a reference position along the defined line between the movable apparatus and the fixed position which constitutes the scan axis of the transmitter.

In the detailed examples described in specification No. 1,046,024, the reticle comprises a disc having a large number of bands, for example sixteen, in the form of alternately opaque and translucent radial sectors whose widths increase linearly with the distance from the center of the reticle. In one example described the receiver comprises two radiation detectors mounted with their receiving areas separated by a short distance, each detector being connected to frequency discriminator, the outputs of which are added to provide a first signal and subtracted to provide a second signal, and two coordinate detectors, into which the two signals are fed to produce the control signal for use in guiding the movable apparatus.

The present invention is concerned with providing a modified form of the guidance apparatus of British Pat. No. 1,046,024 which employs a receiver with simplified and less expensive circuitry in conjection with a simplified form of reticle, which provides the advantages of a lower spatial frequency, e.g. easier optical resolution.

According to the invention guidance apparatus comprises a transmitter for mounting in a fixed position and a receiver for fixing to a movable apparatus which is to be guided along a straight path determined by the transmitter, the latter comprising a source of visible or infrared radiation for illuminating a first member located in the transmitter and in the form of a reticle divided into four optical quadrants of differing opacity, the opacities of the first and third quadrants being different from the opacities of the second and fourth quadrants, a second member in the form of an optical member located on the opposite side of the reticle to the source and for collecting radiation which has passed through the reticle from the source, and means for causing effective rotation of the axis of one of the members around the axis of the other member so that during the effective rotation, quadrants of different opacity alternately move across the path of the radiation which after collection is emitted from the transmitter as a beam of radiation, and the receiver including at least two radiation detectors arranged side by side and separated by a short distance, the outputs of the two radiation detectors being added to provide a first signal and subtracted to provide a second signal, in each case without first being fed through a frequency discriminator, the first and second signals being utilized to produce control signals by means of which the movable apparatus may be guided along the straight path.

The first and second signals may be fed into a first coordinate detector in which the first signal is multiplied by the second signal, and either the first signal or the second signal is caused to undergo 90° phase-shift, and the one signal and the phase-shifted other signal are fed into a second coordinate detector in which they are multiplied the one by the other, whereby the outputs of the two coordinate detectors are proportional to the deviation of the point midway between the two radiation detectors from the scan axis, and constitute the control signals for use in guiding the movable apparatus.

Preferably the outputs from the radiation detectors are amplified and are shaped to accurate rectangular wave form by means of amplitude limiting circuits or bistable switching elements before being summed and differenced.

In a preferred form, the reticle is divided into four quadrants, the opacities of the first and third quadrants being equal and the opacities of the second and fourth quadrants being q equal and differing from that of the first and third quadrants.

The invention may be carried into practice in various ways, tone specific embodiment will now be described by way of example with reference to the accompanying drawings, in which.

Figure 1:
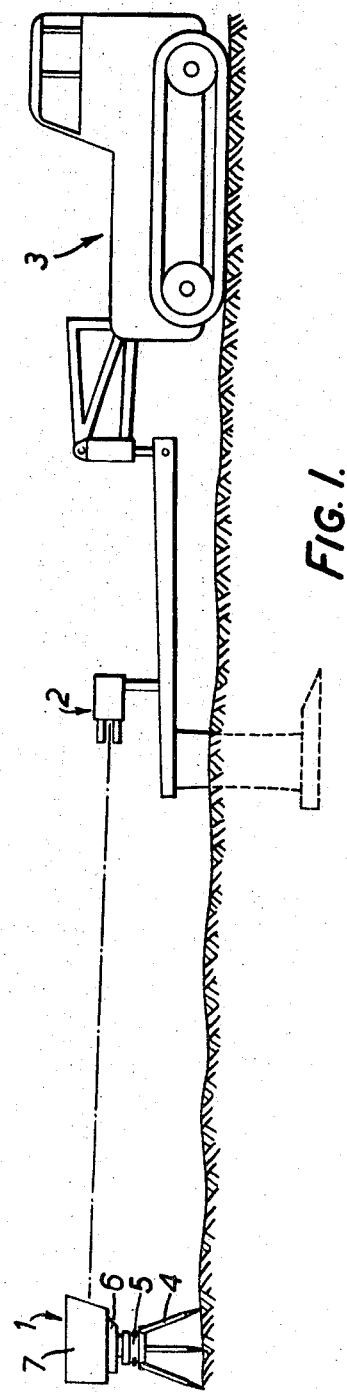
FIG. 1 is a diagram showing how guidance apparatus embodying the invention and comprising a transmitter and a receiver is used for guiding a mole plow.

FIG. 1 shows a typical use of the apparatus, whose transmitter shown generally at 1 is placed in a fixed position and whose detector 2 is mounted on the tool of the movable apparatus such as a mole plow shown generally as 3. The transmitter is mounted on a conventional tripod 4 which has an integral mounting platform 5 having three levelling screws for rough levelling, and to which is attached a transmitter elevation base 6 carrying a main bulk head 7. Switches, fine levelling adjustments and controls for the transmitter are all contained in the elevation base 6 and the main bulk head 7, the latter also housing the optical transmitting apparatus. The transmitter is provided with controls for both azimuth and elevation and also includes a telescope to facilitate sighting.

Figure 2:
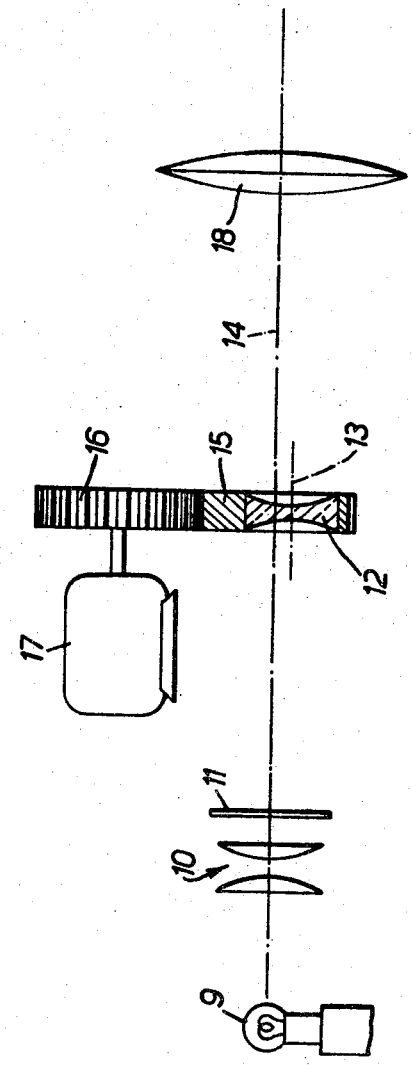
FIG. 2 is an optical diagram of the transmitter of the apparatus.
Figure 3:
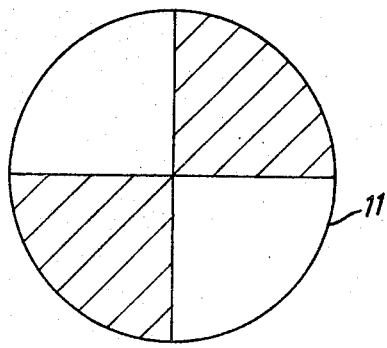
FIG. 3 is an elevation of the reticle incorporated in the transmitter.

FIG. 2 shows schematically the arrangement of the optical system within the main bulk head 7. This includes a filament lamp 9, underrun to increase its life and reduce power consumption, positioned near the focal plane of a condenser 10. Light will thus leave the condenser 10 and fall on a reticle 11 so causing this to be illuminated. The reticle 11 which is placed close to the condenser 10, is photoetched from thin metal plate and comprises a disc made up of four alternate translucent and opaque quadrants as shown in FIG. 3. The translucent sectors are of equal translucency and the opaque sectors completely prevent the passage of light.

Nutation of the reticle image is achieved by virtual rotation by means of a negative lens 12 which is mounted for eccentric rotation with its optical axis 13 displaced from the optical axis 14, i.e. the scan axis, of the transmitter. The negative lens 12, which forms a virtual image of the reticle, is mounted eccentrically within an annular gear ring 15 and is arranged to be rotated by an electric motor 17 through a driving gear 16. A fixed objective lens 18 is located in front of the negative lens 12, coaxial with the scan axis 14, so that the virtual image of the reticle is near the focal point of the objective lens. It is preferred, in order to optimize the optical system to locate the negative lens 12 midway between the reticle and the objective lens.

Figure 6:
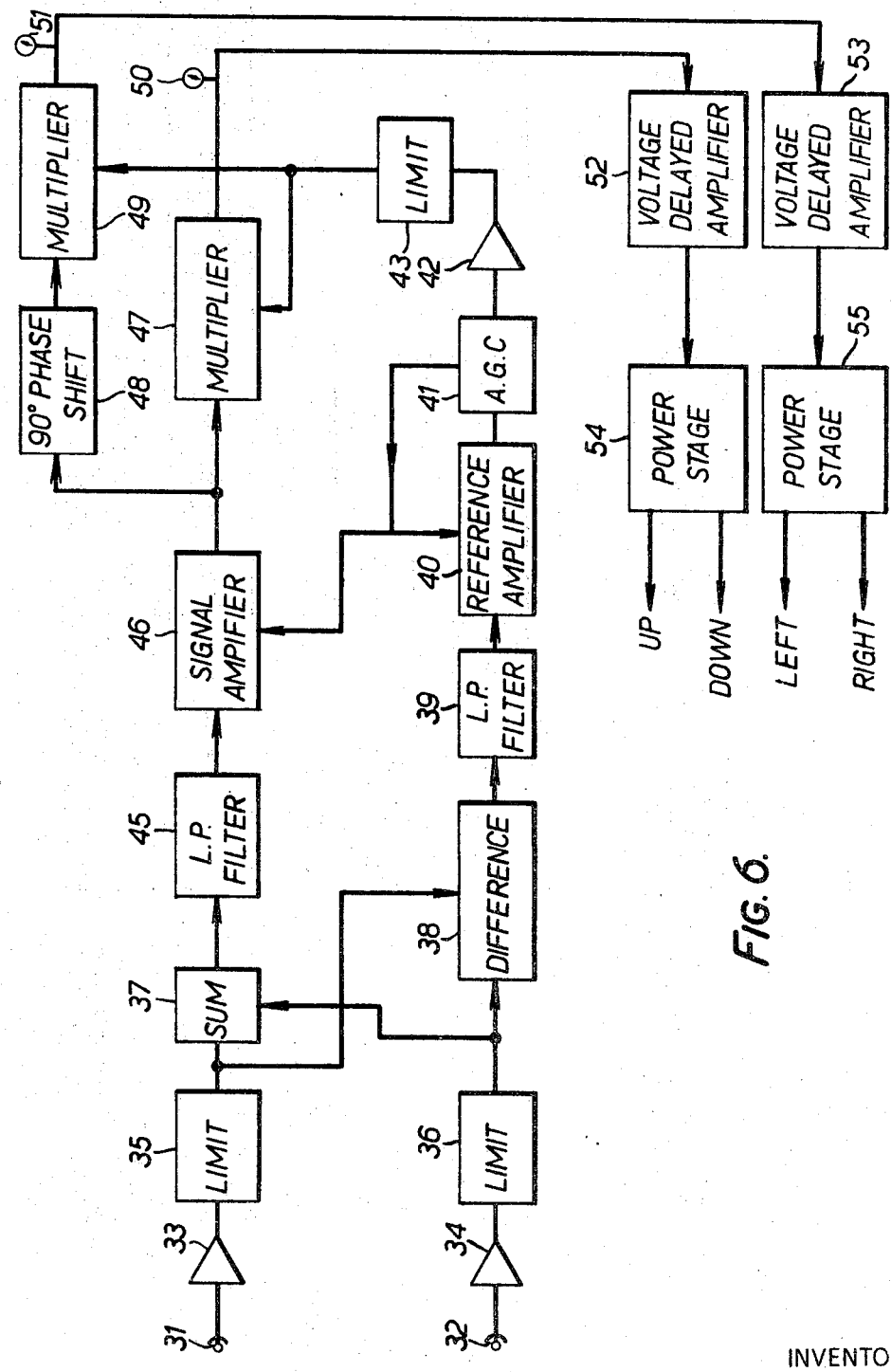
FIG. 6 is a block circuit diagram of the receiver.

From FIG. 1 it will be seen that this beam falls on the detector 2 of the receiver, mounted on the tool of the mole plow. The detector 2 comprises two nominally vertically aligned photoelectric cells 31 and 32, the receiving surfaces of which are separated by a short vertical distance as shown in FIGS. 1 and 6.

It will be understood that as the projected image of the reticle in the plane of the detectors is nutated about a fixed center, the axis of a single photocell 31 or 32 will in effect describe a circle in relation to the reticle image, that circle being centered on the reticle image center when the photocell is correctly aligned with the scan axis (defined line) of the transmitter. If the detector photocell is now misaligned to a position having polar coordinates $r$, $\alpha$ with respect to the transmitter scan axis, then the center of the circle traced in effect by the photocell axis relatively to the image of the reticle will be misaligned in an identical way.

Figure 4:
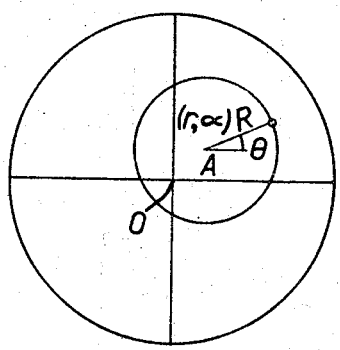
FIG. 4 is a diagram showing the trace circle of one detector photocell of the receiver relatively to the reticle image for a given misalignment.

FIG. 4 shows the equivalent scanning geometry for one misaligned detector photocell 30 or 31, and is essentially the geometry seen by an observer fixed relatively to the reticle image.

Figure 5:
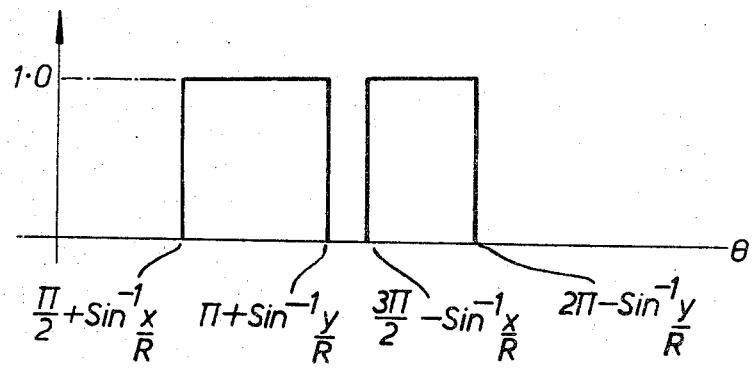
FIG. 5 is a diagram of the idealized output wave form of the photocell over a single cycle.

R is the trace circle radius (proportional to range with a diverging beam), $\theta$ is the scan angle at a given moment $r$, $\alpha$ are the poplar coordinates of misalignment of the center A of the trace circle from the center $\theta$ of the reticle image, $x,y$ are the cartesian coordinates of misalignment of the center A of the trace circle, and $\omega$ is the scan frequency $= d\theta/dt$ As the axis of the photocell 30 or 31 notionally follows the trace circle relatively to the image of the reticle, the light received by the photocell will be modulated by the alternatively dark and light quadrants of the image of the reticle, and the photocell will produce an electrical output whose idealized wave form over one cycle is illustrated in FIG. 5. The mean value of this output is constant at 0.5 peak value, but its wave form is rectangular, and the fundamental is made up of two components, namely $\frac{x}{\pi R} \sin \theta$ and $\frac{y}{\pi R} \cos \theta$, which combine to give $\frac{1}{\pi} \frac{r}{R} \sin (\theta + \alpha)$ where $\alpha = \tan^{-1} y/x$ Thus the fundamental of the output from either photocell 30 or 31 with this arrangement is exactly analogous to the output of the corresponding frequency discriminator utilized in the arrangement of Pat. No. 1,046,024, in which a reticle having a large number of alternating sectors is employed and in which the outputs of the photodetectors are supplied to frequency discriminators before being added and subtracted.

Accordingly, with the present invention the same basic circuitry arrangements can be employed for deriving a reference signal and an information signal from the outputs of the two photocells 31 and 32 by adding and subtracting those outputs, but without the necessity for employing frequency discriminators to derive amplitude variations in response to the frequency variations of the photocell outputs produced by the modulated light beam.

FIG. 6 shows a suitable receiver system of the analogue type for this purpose. The outputs from the two vertically spaced photocells 31 and 32 are respectively supplied to matched amplifiers 33 and 34 and limited by matched amplitude-limiting circuits 35 and 36, in order to correct their wave forms and produce true rectangular waves as shown in FIG. 5. As an alternative to the amplifier/limiter combinations, matched bistable switching elements incorporating solid-state devices may be employed for operation by the amplified photodetector outputs.

The true rectangular waveform outputs of the limiters 35 and 36 are added in a summing circuit 37 to produce an information signal, and are also subtracted in a differencing circuit 38 to produce a reference signal. The reference signal from the differencing circuit 38 passes through a low-pass filter 39 to remove components above the scanning frequency, and the filtered reference signal is then amplified in a reference amplifier 40 of variable-gain type. The amplifier 40 has a feedback loop through an automatic gain control device 41, and the feedback signal from the device 41 is applied to the reference amplifier 40 in order to control its gain, and in this way the output level of the reference amplifier 40 is held constant and is independent of the divergence of the transmitted beam and therefore of the range between the transmitter and receiver of the guidance apparatus. After leaving the automatic gain control device 41 the reference signal is further amplified in an amplifier 42 and passes through a further amplitude limiter 43 to produce a switching signal for the coordinate detectors.

The information signal obtained from the summing circuit 37 is also filtered by a low-pass filter 45 to remove components above the scanning frequency, and passes to a signal amplifier 46 is also held constant, for a given linear misalignment of the detector, failing which it would fall off immensely with range.

The information signal from the signal amplifier 46 is supplied to a Y-coordinate detector 47 where it is multiplied by the reference signal also fed into the Y-coordinate detector 47 from the limiting circuit 43. The information signal is also fed to a 90° phase-shift network 48 and then to an X-coordinate detector 49 by which the phase-shifted information signal is multiplied by the reference signal supplied from the limiting circuit 43.

The coordinate detectors or multipliers 47, 49, may contain filters to remove components at the scanning frequency and above. Thus only the DC component of the product of the two signals, which is an analogue of the detector misalignment along the line joining the photocells 31 and 32, appears at the output of the multiplier 47. Such filtering may not be essential if the bandwidth of the servo being controlled is sufficiently narrow. Other forms of multipliers could moreover be used, for example a Hall effect device, in which it would not be necessary to limit the reference signal and the limiter 43 could be dispensed with.

The outputs of the multipliers 47 and 49 can be measured by meters 50 and 51 which given visual indications of the Cartesian components of misalignment of the detectors with respect to the scan axis (defined line), to assist in the correction of such misalignment. Moreover the outputs of the multipliers 47 and 49 are also fed through voltage-delayed amplifiers 52 and 53 to power stages 54 and 55 to produce control signals, which are respectively up/down and left/right, for adjusting the level control and steering of the mole plow 3 or other carrier on which the detector 2 is mounted, for the purpose of restoring the true alignment of the detector.

It will be appreciated that the pattern of the simple four sector reticle 11 employed with this arrangement provides low spatial frequency for modulation of the optical beam and is therefore less subject to aberration when projected optically.

If desired a modified modified form of transmitter may be employed, as also described in British Pat. No. 1,046,024, in which instead of the rotated lens 12, there is provided an eccentrically rotated assembly of two prisms having parallel reflecting faces. This assembly is rotated in front of the illuminated illuminated reticle so as to transmit to the lens 30 a nutating image of the peripheral portion of the reticle to provide the required modulated light beam for projection by the lens 30 towards the receiver.

I claim:

1. A guidance system comprising a transmitter for mounting in a fixed position and a receiver for fixing to a movable apparatus which is to be guided along a straight path determined by the transmitter, the transmitter comprising a source of optical radiation for illuminating a first member located in the transmitter and in the form of a disclike reticle divided into four optical quadrants of differing opacity, the quadrants being distributed around a common center at their apices, and the opacities of the first and third quadrants being substantially different from the opacities of the second and fourth quadrants, a second member in the form of an optical member located on the opposite side of the reticle to the source and for collecting radiation which has passed through the reticle from the source, and means for causing effective rotation of the axis of one of the members around the axis of the other member so that during the said rotation the quadrants of different opacity successively move across the path of the radiation, which radiation after collection is emitted from the transmitter as a modulated beam of radiation, and the receiver including at least two radiation detectors arranged side by side and separated by a short distance, the outputs of the two radiation detectors being added to provide a first signal and subtracted to provide a second signal, in each case without being first fed through a frequency discriminator, the first and second signals being utilized to produce control signals by means of which the movable apparatus may be guided along the straight path.

2. A guidance system as claimed in claim 1 in which the first and second signals are fed into a first coordinate detector in which the first signal is multiplied by the second signal, and in which one of the first and second signals is caused to undergo a 90° phase-shift, and the one signal and the phase-shifted other signal are fed into a second coordinate detector in which they are multiplied the one by the other, the resulting outputs of the two coordinate detectors being proportional to the deviation of the point midway between the two radiation detectors from the center line of the radiation being received, and constituting the control signals for use in guiding the movable apparatus.

3. A guidance system as claimed in claim 2 in which the outputs from the radiation detectors are amplified and are shaped to accurate rectangular wave form by means of amplitude limiting circuits before being summed and differenced.

4. A guidance system as claimed in claim 1 in which the optical axis of the second member of the transmitter is offset from the axis of the radiation emitted by the transmitter, and in which the optical member is rotated about the axis of radiation emitted by the transmitter.

5. A guidance system as claimed in claim 1 wherein the opacities of the first and third quadrants of the reticle are equal and the opacities of the second and fourth quadrants are equal and different from that of the first and third quadrants.

6. A guidance system as claimed in claim 5 in which the first and third quadrants of the reticle are opaque and the second and fourth quadrants are translucent.